(12) United States Patent
Nielsen

(10) Patent No.: US 12,425,054 B2
(45) Date of Patent: Sep. 23, 2025

(54) MULTIPLE ANTENNA ARRANGEMENTS

(71) Applicant: Nokia Technologies Oy, Espoo (FI)

(72) Inventor: Kim Nielsen, Storvorde (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 689 days.

(21) Appl. No.: 17/720,758

(22) Filed: Apr. 14, 2022

(65) Prior Publication Data

US 2022/0337274 A1   Oct. 20, 2022

(30) Foreign Application Priority Data

Apr. 15, 2021   (FI) ..................................... 20215445

(51) Int. Cl.
*H04B 1/00* (2006.01)
(52) U.S. Cl.
CPC ......... *H04B 1/0064* (2013.01); *H04B 1/0096* (2013.01)
(58) Field of Classification Search
CPC ............................. H04B 1/0064; H04B 1/0096
USPC ......................................................... 455/109
See application file for complete search history.

(56) References Cited

U.S. PATENT DOCUMENTS

| | | | | |
|---|---|---|---|---|
| 5,995,815 A * | 11/1999 | Blom | ...................... | H04B 1/406 455/143 |
| 6,609,010 B1 * | 8/2003 | Dolle | .................. | H04B 1/0096 455/84 |
| 6,985,545 B2 * | 1/2006 | Teo | ....................... | H04W 16/14 375/147 |
| 7,554,447 B2 * | 6/2009 | Cox | ...................... | H01Q 21/08 340/572.1 |

(Continued)

FOREIGN PATENT DOCUMENTS

| | | |
|---|---|---|
| CN | 1179071 A | 4/1998 |
| CN | 1233359 A | 10/1999 |

(Continued)

OTHER PUBLICATIONS

Office Action for Chinese Application No. 202210395653.9 dated Nov. 28, 2024, 13 pages.

(Continued)

*Primary Examiner* — April G Gonzales
(74) *Attorney, Agent, or Firm* — ALSTON & BIRD LLP

(57) ABSTRACT

An apparatus comprising:
first radio frequency receiver circuitry configured for operation at least in one or more first radio frequency bands;
at least a first antenna arrangement configured for operation in the one or more first radio frequency bands;
at least a second antenna arrangement configured for operation in one or more second radio frequency bands;
a frequency down-converter for converting a frequency of a signal received via the second antenna arrangement, in one or more second radio frequency bands, to the one or more first radio frequency bands;
a radio frequency path to the first radio frequency receiver circuitry that is configured for transferring the signal received via the second antenna arrangement after down-conversion to the one or more first radio frequency bands and for transferring a signal received via the first antenna arrangement in the one or more first radio frequency bands.

18 Claims, 9 Drawing Sheets

(56) References Cited

U.S. PATENT DOCUMENTS

| | | | | |
|---|---|---|---|---|
| 7,898,479 | B1* | 3/2011 | VanLaningham | G01S 7/021 |
| | | | | 342/442 |
| 7,961,147 | B1* | 6/2011 | VanLaningham | G01S 3/043 |
| | | | | 342/442 |
| 8,483,753 | B2* | 7/2013 | Behzad | H04W 88/06 |
| | | | | 455/552.1 |
| 9,544,792 | B2* | 1/2017 | Cheng | H04W 72/542 |
| 10,135,482 | B2* | 11/2018 | Adams | H04B 1/0483 |
| 10,673,135 | B2* | 6/2020 | Yu | H01Q 3/24 |
| 11,038,728 | B1* | 6/2021 | Hastings | H04L 27/144 |
| 11,171,682 | B2* | 11/2021 | Chi | H04B 1/44 |
| 11,258,469 | B1* | 2/2022 | Hastings | H04B 1/0082 |
| 2003/0013482 | A1* | 1/2003 | Brankovic | H04B 1/005 |
| | | | | 455/553.1 |
| 2004/0204036 | A1* | 10/2004 | Yang | H04B 1/403 |
| | | | | 455/313 |
| 2005/0277387 | A1* | 12/2005 | Kojima | H01Q 21/28 |
| | | | | 455/562.1 |
| 2005/0280561 | A1* | 12/2005 | Face | H03K 17/965 |
| | | | | 341/34 |
| 2009/0042529 | A1* | 2/2009 | Lindenmeier | H04L 1/04 |
| | | | | 455/277.2 |
| 2013/0016633 | A1* | 1/2013 | Lum | H04B 1/16 |
| | | | | 370/297 |
| 2013/0203364 | A1* | 8/2013 | Darnell | H01Q 1/243 |
| | | | | 455/90.3 |
| 2015/0123873 | A1 | 5/2015 | Perumana et al. | |
| 2015/0256207 | A1* | 9/2015 | Liao | H04B 1/0007 |
| | | | | 375/349 |
| 2016/0248451 | A1* | 8/2016 | Weissman | H04W 72/0453 |
| 2018/0278277 | A1* | 9/2018 | Patel | H04B 1/0067 |
| 2018/0331714 | A1* | 11/2018 | See | H04B 7/0814 |
| 2018/0375572 | A1* | 12/2018 | Garcia | H04B 7/18584 |
| 2019/0104488 | A1* | 4/2019 | Tawadrous | H04W 4/44 |
| 2019/0246364 | A1* | 8/2019 | Jung | H04W 52/52 |
| 2019/0356362 | A1* | 11/2019 | Chi | H04B 1/0014 |
| 2020/0091608 | A1* | 3/2020 | Alpman | H03L 7/145 |
| 2020/0106166 | A1* | 4/2020 | Wu | H01Q 5/364 |
| 2020/0195301 | A1* | 6/2020 | Matthews | H04L 12/18 |
| 2020/0244302 | A1 | 7/2020 | Chi et al. | |
| 2020/0284898 | A1* | 9/2020 | Nanzer | G01S 13/583 |
| 2020/0358501 | A1* | 11/2020 | Hormis | H04B 7/0695 |
| 2021/0028801 | A1* | 1/2021 | Duxbury | H04B 1/005 |
| 2021/0265743 | A1* | 8/2021 | Furuhi | H01Q 21/061 |
| 2022/0109592 | A1* | 4/2022 | Hastings | H04B 1/0064 |

FOREIGN PATENT DOCUMENTS

| | | |
|---|---|---|
| CN | 1689194 A | 10/2005 |
| CN | 102882539 A | 1/2013 |
| CN | 104798309 A | 7/2015 |
| EP | 3754858 A1 | 12/2020 |
| WO | WO 2019/194362 A1 | 10/2019 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 16)", 3GPP TS 36.101 v16.9.0, (Mar. 2021), 2047 pages.

"3rd Generation Partnership Project; Technical Specification Group Radio Access Network; NR; User Equipment (UE) radio transmission and reception; Part 3: Range 1 and Range 2 Interworking operation with other radios (Release 16)", 3GPP 38.101-3 v16.7.0, (Mar. 2021), 531 pages.

"NR Frequency Band", Retrieved via the Wayback Machine on Nov. 10, 2022, <URL:https://web.archive.org/web/20210318212531/https://www.sqimway.com/nr_band.php>, (Mar. 18, 2021), 6 pages.

"Qorvo Announces Volume Production of Mobile 5G RFEMs", Retrieved via the Internet on Nov. 10, 2022, <URL:https://www.everythingrf.com/News/details/7771-Qorvo-Announces-Volume-Production-of-Mobile-5G-RFEMs>, (Feb. 28, 2019), 4 pages.

Cabric et al., "Spectrum Sharing Radios", IEEE Circuits and Systems Magazine, vol. 6, Issue 2, (Jul. 5, 2006), 16 pages.

Campos, J., "Understanding the 5G NR Physical Layer", Retrieved via the Internet on Nov. 10, 2022, <URL:https://www.keysight.com/us/en/assets/9921-03326/training-materials/Understanding-the-5G-NR-Physical-Layer.pdf>, (Nov. 1, 2017), 111 pages.

Interdigital, Inc., "MPUE and Panel Specific Uplink Transmission", 3GPP TSG RAN WG1 #96b, R1-1904861, (Apr. 8-12, 2019), 5 pages.

Office Action for Finland Application No. 20/215,445 dated Dec. 23, 2021, 11 pages.

Partial European Search Report for European Application No. 22165802.4 dated Sep. 22, 2022, 14 pages.

Qualcomm Technologies Inc., "First 5G mmWave Antenna Module for Smartphones", Retrieved via the Internet on Sep. 30, 2019, <URL:https://www.microwavejournal.com/articles/31448-first-5g-mmwave-antenna-module-for-smartphones>, (Dec. 12, 2018), 4 pages.

Vishwakarma et al., "Apple iphone 12 Pro 5G mmWave Report", Retrieved via the Internet on Nov. 10, 2022, <URL: https://unitedlex.com/insights/apple-iphone-12-pro-5g-mmwave-report/>, (2020), 15 pages.

Office Action for Chinese Application No. 202210395653.9 dated Jul. 27, 2023, 22 pages.

Saranya et al., "A Shared-Aperture Frequency Reconfigurable Multiport Antenna Using Switches", 2019 International Conference on Recent Advances in Energy-Efficient Computing and Communication (ICRAECC), (Mar. 7-8, 2019), 4 pages.

Office Action for Chinese Application No. 202210395653.9 dated Apr. 26, 2024, 14 pages.

Extended European Search Report for European Application No. 22165802.4 dated Jan. 3, 2023, 11 pages.

Office Action for Chinese Application No. 202210395653.9 dated Mar. 30, 2025, 17 pages.

Office Action for Chinese Application No. 202210395653.9 dated Jun. 27, 2025, 13 pages.

Office Action for European Application No. 22165802.4 dated Aug. 18, 2025, 5 pages.

* cited by examiner

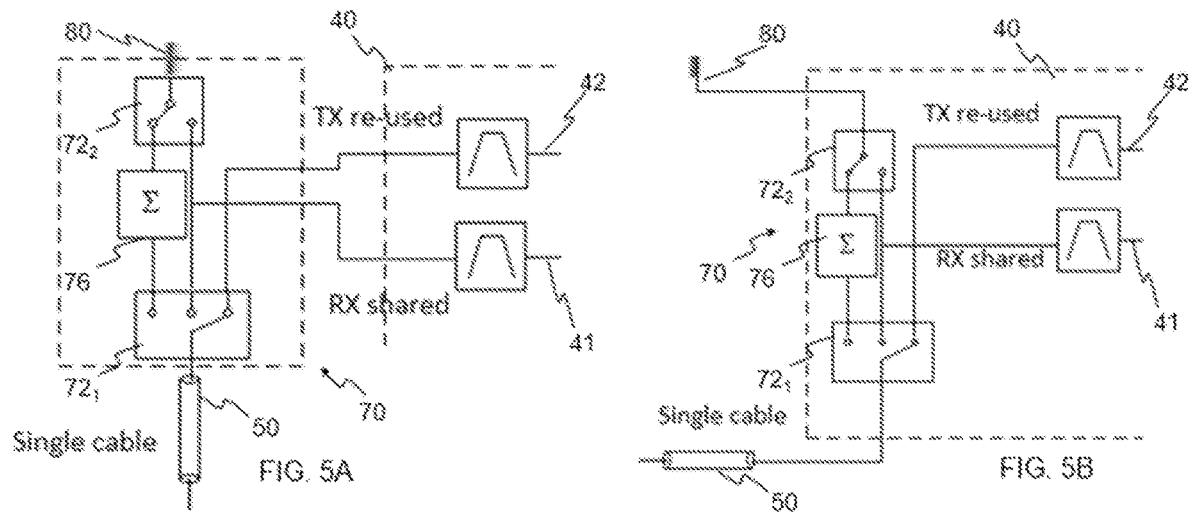
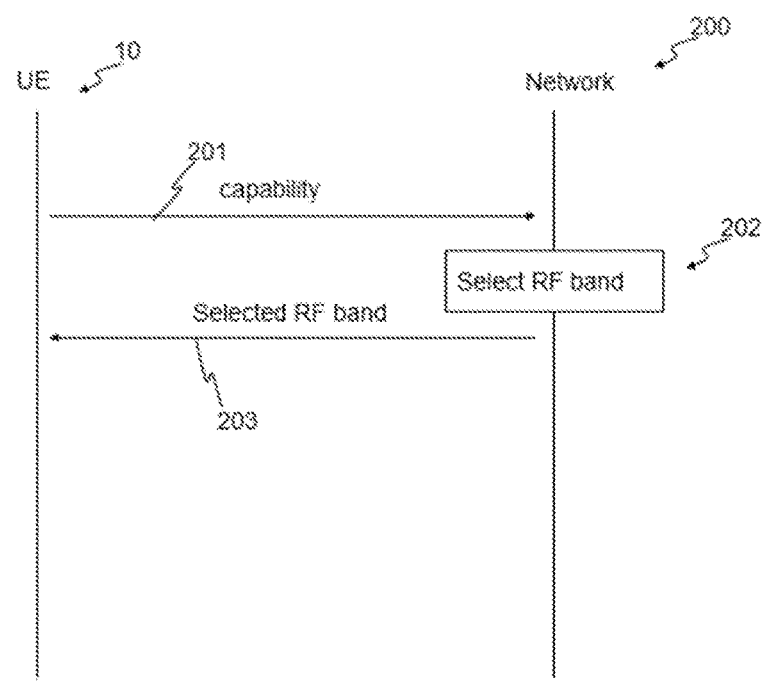
FIG. 6

MULTIPLE ANTENNA ARRANGEMENTS

CROSS-REFERENCE TO RELATED APPLICATION

This application claims priority to Finnish Patent Application No. 20215445 filed Apr. 15, 2021, the entire contents of which are incorporated herein by reference.

TECHNOLOGICAL FIELD

Embodiments of the present disclosure relate to apparatus that use multiple antenna arrangements.

BACKGROUND

Antenna arrangements, whether individual antennas or antenna arrays, are configured for operation in specific operational frequency bands.

Specific radio frequency receiver circuitry is often configured to operate with specific antenna arrangements.

Radio frequency circuitry has associated manufacturing costs and also associated energy consumption.

BRIEF SUMMARY

According to various, but not necessarily all, embodiments there is provided an apparatus comprising:
  first radio frequency receiver circuitry configured for operation at least in one or more first radio frequency bands;
  at least a first antenna arrangement configured for operation in the one or more first radio frequency bands;
  at least a second antenna arrangement configured for operation in one or more second radio frequency bands;
  a frequency down-converter for converting a frequency of a signal received via the second antenna arrangement, in one or more second radio frequency bands, to the one or more first radio frequency bands;
  a radio frequency path to the first radio frequency receiver circuitry that is configured for transferring the signal received via the second antenna arrangement after down-conversion to the one or more first radio frequency bands and for transferring a signal received via the first antenna arrangement in the one or more first radio frequency bands.

According to some, but not necessarily all examples, the first radio frequency receiver circuitry is configured for operation at least in the one or more first RF bands but not for operation in any of the second radio frequency bands, wherein the first radio frequency bands occupy a first frequency range and the second radio frequency bands occupy a second frequency range that does not overlap the first frequency range.

According to some, but not necessarily all examples, the apparatus comprises a node at which the radio frequency path meets with a second radio frequency path to the second antenna arrangement via the frequency down-converter and a first radio frequency path to the first antenna arrangement not via the frequency down-converter, wherein a length of the radio frequency path between the node and the first radio frequency receiver circuitry is at least an order of magnitude greater than a length of the first radio frequency path and at least an order of magnitude greater than a length of the second radio frequency path.

According to some, but not necessarily all examples, the frequency down-converter is programmable to convert a frequency of a signal received via the second antenna arrangement, in one of the second radio frequency bands, to a selected first radio frequency bands.

According to some, but not necessarily all examples, the selected first radio frequency bands is selected because it is an available radio frequency band at the first radio frequency receiver circuitry.

According to some, but not necessarily all examples, the selected first radio frequency bands is selected at a network and communicated to the apparatus from the network.

According to some, but not necessarily all examples, the apparatus is configured to transit information identifying capability or capabilities of at least the first radio frequency receiver circuitry to the network to support network selection of the selected first radio frequency band.

According to some, but not necessarily all examples, the apparatus comprises selection means for selectively connecting the radio frequency path to the second antenna arrangement via the frequency down converter or to the first antenna arrangement not via the frequency down-converter.

According to some, but not necessarily all examples, the apparatus comprises means for simultaneously connecting the radio frequency path to the second antenna arrangement via the radio frequency down-converter and to the first antenna arrangement not via the frequency down-converter.

According to some, but not necessarily all examples, the apparatus comprises: first radio frequency transmitter circuitry configured for operation at least in one or more first radio frequency bands;
  a frequency up-converter for converting a frequency of a signal for transmission via the second antenna arrangement form one or more first radio frequency bands to one or more second radio frequency bands;
  selection means for connecting the first radio frequency transmitter circuitry via the radio frequency path to:
  the second antenna arrangement via the frequency up converter or to the first antenna arrangement not via the frequency up-converter.

According to some, but not necessarily all examples, the apparatus comprises:
  multiple first antenna arrangements configured for operation in one or more first radio frequency bands wherein the multiple first antenna arrangements are spatially diverse; and
  a switching arrangement configured to connect the multiple first antenna arrangements to the first radio frequency receiver circuitry,
  or
  comprises:
  multiple first radio frequency circuitry configured for operation at least in one or more first RF bands;
  multiple first antenna arrangements configured for operation in one or more first radio frequency bands, wherein the first antenna arrangements are spatially diverse, wherein the multiple antenna arrangements use respective first radio frequency receiver circuitry.

According to some, but not necessarily all examples, the apparatus comprises:
  multiple second antenna arrangements configured for operation in one or more second radio frequency bands wherein the multiple second antenna arrangements are spatially diverse; and
  a switching arrangement configured to connect the multiple second antenna arrangements to the first radio frequency receiver circuitry;
  or comprises:
multiple first radio frequency circuitry configured for operation at least in one or more first RF bands;
multiple second antenna arrangements configured for operation in one or more second radio frequency bands, wherein the second antenna arrangements are spatially diverse, wherein the multiple second antenna arrangements use respective first radio frequency receiver circuitry.

According to some, but not necessarily all examples, the apparatus comprises second radio frequency transmitter circuitry configured for operation at least in the one or more second radio frequency bands;
a switching arrangement configured to connect the multiple second antenna arrangements to the second radio frequency transmitter circuitry.

According to some, but not necessarily all examples, the apparatus comprises: at least second radio frequency receiver circuitry configured for operation at least in one or more second radio frequency bands;
switching arrangement for switching the second antenna arrangement from being used by the first radio frequency receiver circuitry to being used by the second radio frequency receiver circuitry.

According to some, but not necessarily all examples, the switching arrangement is configured to switch the second antenna arrangement from being used by the first radio frequency receiver circuitry to being used by the second radio frequency receiver circuitry in response to satisfaction of a switch condition, wherein the switch condition is:
completion of initial access and beam management for the second radio frequency bands;
complexity of the signal received in the second radio frequency bands exceeds a complexity threshold.

According to some, but not necessarily all examples, the first radio frequency bands are in a first frequency range (FR1) below 10 GHz and the second radio frequency bands are in a second frequency range (FR2) above 20 GHz According to some, but not necessarily all examples, at least a portion of the radio frequency path is provided by a coaxial cable configured for transferring a signal received via the second antenna arrangement, after down-conversion to the one or more first radio frequency bands, and for transferring a signal received via the first antenna arrangement in the one or more first radio frequency bands.

According to some, but not necessarily all examples, the apparatus is configured as mobile equipment or user equipment.

According to some, but not necessarily all examples, there is provided a module for use in the apparatus, the module comprising:
the second antenna arrangement configured for operation in one or more second radio frequency bands; and
the frequency down converter for converting a frequency of a signal received via the second antenna arrangement, in one or more second radio frequency bands, to one or more first radio frequency bands.

According to various, but not necessarily all, embodiments there is provided an apparatus comprising:
radio frequency circuitry configured for operation at least in one or more first radio frequency bands;
a first antenna arrangement configured for operation in the one or more first radio frequency bands;
a second antenna arrangement configured for operation in one or more second radio frequency bands;
a radio frequency path configured to enable transfer of a signal in the one or more first radio frequency bands between the radio frequency circuitry and the first antenna arrangement and also between the radio frequency circuitry and the second antenna arrangement; and
a frequency converter positioned between the radio frequency path and the second antenna arrangement configured to enable, for a signal, frequency conversion between the one or more second radio frequency bands and the one or more first radio frequency bands.

The following description describes different apparatus that comprise:
radio frequency circuitry configured for operation at least in one or more first radio frequency bands;
a first antenna arrangement configured for operation in the one or more first radio frequency bands;
a second antenna arrangement configured for operation in one or more second radio frequency bands;
a radio frequency path configured to enable transfer of a signal in the one or more first radio frequency bands between the radio frequency circuitry and the first antenna arrangement and also between the radio frequency circuitry and the second antenna arrangement; and
a frequency converter positioned between the radio frequency path and the second antenna arrangement configured to enable, for a signal, frequency conversion between one or more second radio frequency bands and one or more first radio frequency bands.

According to various, but not necessarily all, embodiments there is provided examples as claimed in the appended claims.

BRIEF DESCRIPTION

Some examples will now be described with reference to the accompanying drawings in which:

FIGS. 5A & 5B show other examples of the subject matter described herein;

FIG. 6 shows another example of the subject matter described herein;

DETAILED DESCRIPTION

Figure 1:
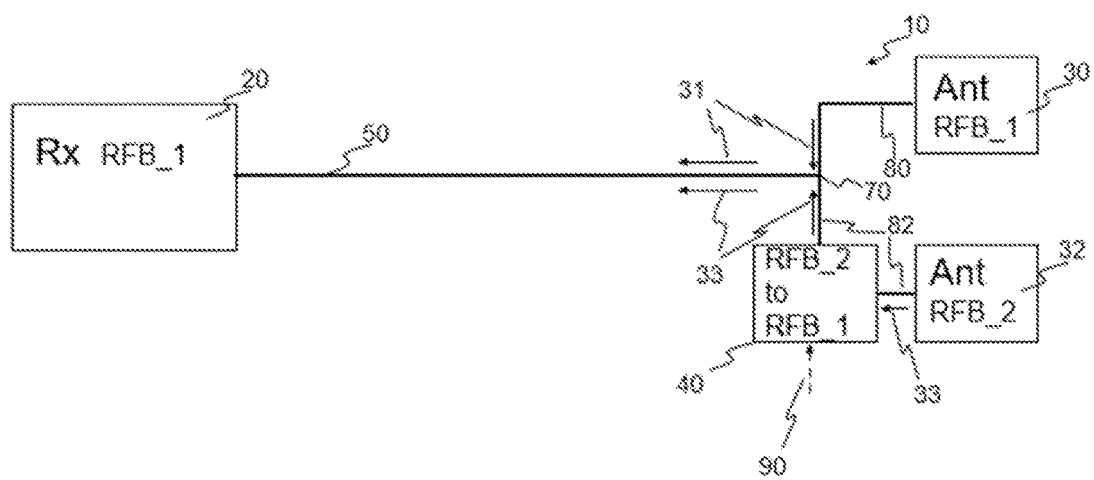
FIG. 1 shows an example of the subject matter described herein.

The following description describes different apparatus 10 that comprise:
  first radio frequency receiver circuitry 20 configured for operation at least in one or more first radio frequency bands;
  at least a first antenna arrangement 30 configured for operation in the one or more first radio frequency bands;
  at least a second antenna arrangement 32 configured for operation in one or more second radio frequency bands;
  a frequency down-converter 40 for converting a frequency of a signal 33 received via the second antenna arrangement 32, in one or more second radio frequency bands, to the one or more first radio frequency bands; and
  a radio frequency path 50 to the first radio frequency receiver circuitry 20 that is configured for transferring the signal 33 received via the second antenna arrangement 32 after down-conversion to the one or more first radio frequency bands and for transferring a signal 31 received via the first antenna arrangement 30 in the one or more first radio frequency bands.

There can be a sharing/re-use of components used for the first radio frequency bands (RFB_1) and for the second radio frequency bands (RFB_2). While the first antenna arrangement 30 for the first radio frequency bands (RFB_1) is different (and often physically distinct) from the antenna arrangement 32 for the second radio frequency bands (RFB_2), there can be sharing/re-use of radio frequency circuitry 20 and radio frequency path 40 by using frequency conversion between the radio frequency path 50 and the second antenna arrangement 32.

An antenna arrangement can be an antenna or a group of antennas. The group of antennas can be a panel or array of antennas. An antenna, in contrast to a group of antennas, can be a single antenna, for example and not limited to at least one of: a monopole antenna, a dipole antenna, a loop antenna, a patch antenna, a planar-inverted-F antenna (PIFA), an inverted-F antenna (IFA), a planar inverted-L antenna (PILA), a folded monopole or dipole antenna, a helical or helix antenna, and so on.

Some of the antenna arrangements can have spatial diversity. This can arise from different directionality capability of antenna arrangements and/or this can arise from different physical positions or locations of antenna arrangements.

Some antenna arrangements can have polarization diversity. This can arise from different polarization capability of antenna arrangements.

In the following description reference will be made to frequency converter 40. The frequency converter 40 can be a frequency down-converter 40 and/or a frequency up-converter 40.

In the following description reference will be made to radio frequency circuitry 20. The radio frequency circuitry 20 comprises radio frequency receiver circuitry 20 and/or radio frequency transmitter circuitry. Radio frequency circuitry 20 can be described as radio frequency transceiver circuitry when it comprises radio frequency receiver circuitry 20 and radio frequency transmitter circuitry 20.

In the following description, the apparatus 10 comprises radio frequency circuitry. The radio frequency circuitry comprises radio frequency receiver circuitry. The radio frequency circuitry can comprise radio frequency transceiver circuitry that comprises radio frequency receiver circuitry and radio frequency transmitter circuitry. The radio frequency circuitry therefore comprises radio frequency receiver circuitry and optionally comprises radio frequency transmitter circuitry. The label "20" is used to refer to radio frequency receiver circuitry (comprising radio frequency circuitry) or radio frequency circuitry.

In the following description sub-scripts will be used with a reference to identify a particular instance of the class identified by the reference.

In the following description the sub-script R may be used to identify receiver circuitry and the sub-script T may be used to identify transmitter circuitry.

The following description describes different apparatus 10 that comprise:
  radio frequency circuitry 20 configured for operation at least in one or more first radio frequency bands (RFB_1);
  a first antenna arrangement 30 configured for operation in the one or more first radio frequency bands (RFB_1);
  a second antenna arrangement 32 configured for operation in one or more second radio frequency bands (RFB_2);
  a radio frequency path 50 configured to enable transfer of a signal in the one or more first radio frequency bands (RFB_1) between the radio frequency circuitry 20 and the first antenna arrangement 30 and also between the radio frequency circuitry 20 and the second antenna arrangement 32; and
  a frequency converter 40 positioned between the radio frequency path 50 and the second antenna arrangement 32 configured to enable, for a signal, frequency conversion between one or more second radio frequency bands and one or more first radio frequency bands.

FIG. 1 illustrates an example of an apparatus 10 that comprises: first radio frequency receiver circuitry 20; a first antenna arrangement 30; a second antenna arrangement 32 and a frequency down-converter 40.

The first radio frequency receiver circuitry 20 is configured for operation in one or more first radio frequency bands (RFB_1).

The first antenna arrangement 30 is configured for operation in the one or more first radio frequency bands (RFB_1). A signal 31 in the one or more first radio frequency bands (RFB_1) can be received via the first antenna arrangement 30.

The second antenna arrangement 32 is configured for operation in one or more second radio frequency bands (RFB_2). A signal 33 in the one or more second radio frequency bands (RFB_2) is received via the second antenna arrangement 32.

The signal 31 in the one or more first radio frequency bands (RFB_1) cannot be efficiently received via the second antenna arrangement 32. The signal 33 in the one or more second radio frequency bands (RFB_2) cannot be efficiently received via the first antenna arrangement 30.

The frequency down-converter 40 is configured to convert a frequency of a signal 33 received via the second antenna arrangement 32, in one or more second radio frequency bands (RFB_2), to the one or more first radio frequency bands (RFB_1).

A single radio frequency path 50 is configured for transferring both the signal 33 received via the second antenna arrangement 32 after down-conversion to the one or more first radio frequency bands (RFB_1) to the first radio frequency receiver circuitry 20 and the signal 31 received via the first antenna arrangement 30 in the one or more first radio frequency bands (RFB_1) to the first radio frequency receiver circuitry 20.

In this example, the apparatus 10 comprises a node 70 at which the radio frequency path 50 meets with a second radio frequency path 82 to the second antenna arrangement 32 via the frequency down-converter 40 and a first radio frequency path 80 to the first antenna arrangement 30 not via the frequency down-converter 40. As will be described later the node 70 can be implemented in various different forms. It can for example comprise a switch and/or a combiner.

A length of the radio frequency path 50 between the node 70 and the first radio frequency receiver circuitry 20 can be relatively long. In some but not necessarily all examples, the radio frequency path 50 is at least an order of magnitude greater than a length of the first radio frequency path 80 and/or the radio frequency path 50 is at least an order of magnitude greater than a length of the second radio frequency path 82. In some but not necessarily all examples, the length extends substantially from one side (e.g. a lengthwise end) of a user equipment to an opposing side of the user equipment (e.g. the other lengthwise end). The loss per mm (dB/mm) of a radio frequency path 50 such as, for example a transmission line, typically increases with length and also as frequency increases. The down converter 40 can be placed adjacent the second antenna 32 so as to down-convert the frequency to one which has less loss/mm. In some but not necessarily all examples, the low noise amplifier (LNA), which is typically one of the first blocks in the receiver chain connected to the antenna, is placed in block 40 so that the RF receiver system provides the least impact on system noise due to Friis' formula (the overall noise figure is primarily influenced by the noise figure of the first amplifier stage, the LNA).

In some but not necessarily all examples, at least a portion of the radio frequency path 50 is provided by a coaxial cable and is re-used or shared by the second antenna arrangement 32 and the first antenna arrangement 30.

In some but not necessarily all examples, the radio frequency path 50 is configured to transfer radio frequency signals in the one or more first radio frequency bands (RFB_1) more effectively than radio frequency signals in the one or more second radio frequency bands (RFB_2).

In some but not necessarily all examples, at least a portion of the radio frequency path 50 is provided by a micro high-frequency radio frequency cable, a flexible coaxial cable or an antenna flex cable ribbon, or similar efficient radio frequency transmission line.

In some but not necessarily all examples, the apparatus 10 is configured as mobile equipment or user equipment. The signals 31, 33 received can, for example, be downlink signals from a network or via sidelink signals from a relay, user equipment or another apparatus 10.

Figure 2:
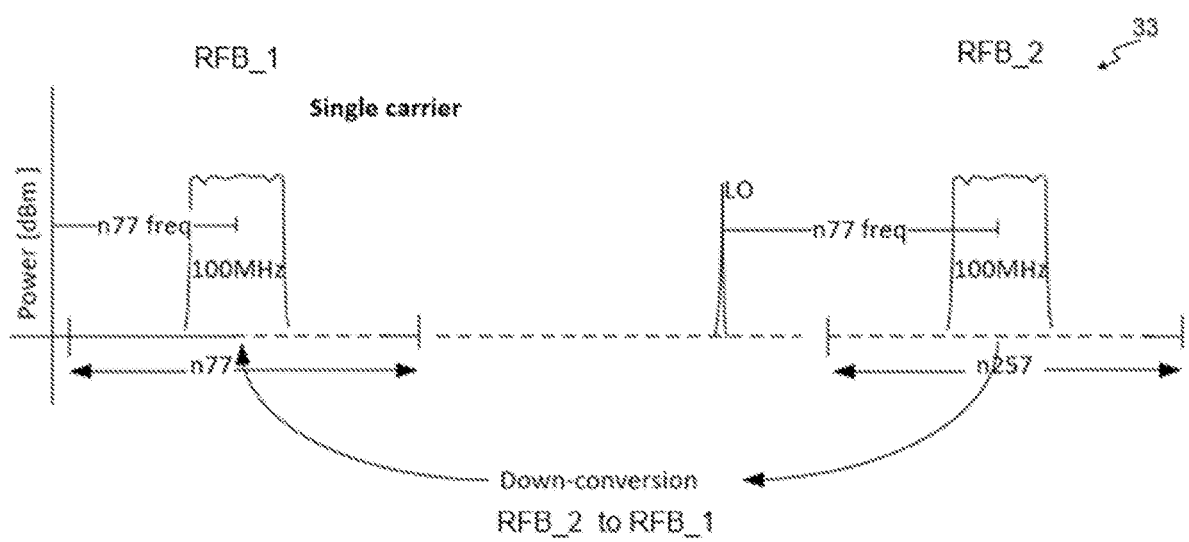
FIG. 2 shows another example of the subject matter described herein.

FIG. 2 illustrates an example of down-conversion of a frequency of a signal 33 received via the second antenna arrangement 32, in one or more second radio frequency bands (RFB_2), to the one or more first radio frequency bands (RFB_1).

In some examples, but not necessarily all examples, the first radio frequency receiver circuitry 20 is configured for operation at least in the one or more first radio frequency bands (RFB_1) but not for operation in any of the second radio frequency bands (RFB_2).

The first radio frequency bands (RFB_1) occupy a first frequency range and the second radio frequency bands (RFB_2) occupy a second frequency range that does not overlap the first frequency range (RFB_1).

In this example, but not necessarily all examples, the one or more second radio frequency bands (RFB_2) are n257 bands defined by specification 3GPP TS 38.101-3. In this example, but not necessarily all examples, the one or more first radio frequency bands (RFB_1) are n77 bands defined by specification 3GPP TS 38.101-3.

As illustrated in FIG. 1, in some examples but not necessarily all examples, the frequency down-converter 40 is programmable by control signal 90 to convert a frequency of a signal 33 received via the second antenna arrangement 32, in one of the second radio frequency bands, to a selected first radio frequency band. The size of down-conversion is programmable.

The target of the down-conversion can therefore be varied. This can be used to target the down-conversion to an unused one or more first radio frequency bands (RFB_1).

For example, the selected first radio frequency band (RFB_1) is selected because it is an available radio frequency band at the first radio frequency receiver circuitry 20.

Figure 3:
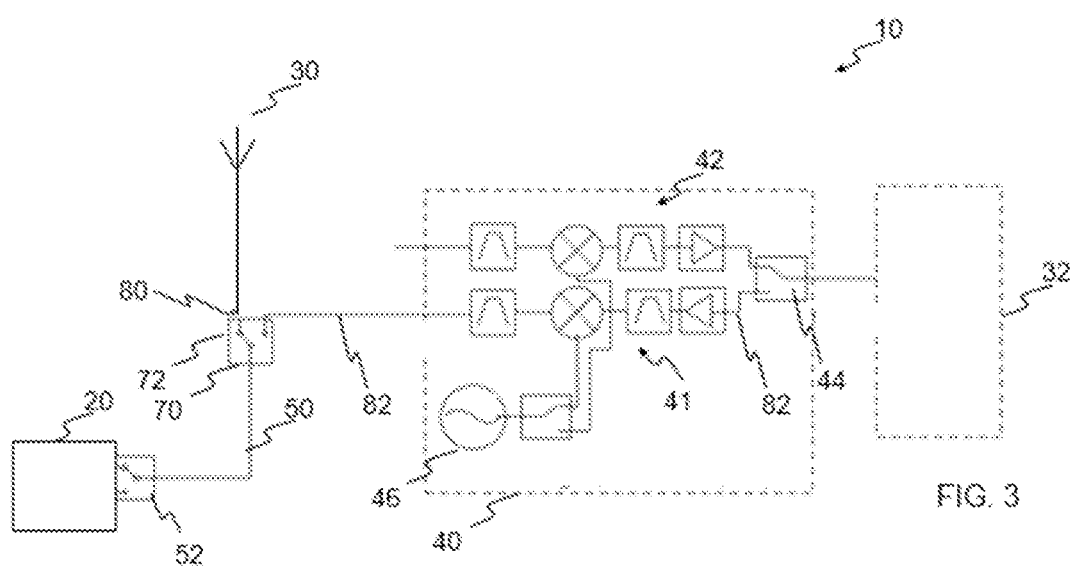
FIG. 3 shows another example of the subject matter described herein.

FIG. 3 illustrates an example of the apparatus 10 previously described with reference to FIG. 1.

The apparatus 10 comprises: first radio frequency circuitry 20; a first antenna arrangement 30; a second antenna arrangement 32 and a frequency converter 40. The frequency converter 40 is both a frequency down-converter (a receiver) and a frequency up-converter (a transmitter).

The first radio frequency circuitry 20 is configured for operation in one or more first radio frequency bands (RFB_1).

The first antenna arrangement 30 is configured for operation in the one or more first radio frequency bands (RFB_1). A signal 31 (not illustrated) in the one or more first radio frequency bands (RFB_1) is received via the first antenna arrangement 30.

The second antenna arrangement 32 is configured for operation in one or more second radio frequency bands (RFB_2). A signal 33 (not illustrated) in the one or more second radio frequency bands (RFB_2) is received via the second antenna arrangement 32.

The frequency converter 40 is configured to convert a frequency of a signal 33 received via the second antenna arrangement 32, in one or more second radio frequency bands (RFB_2), to the one or more first radio frequency bands (RFB_1).

A single radio frequency path 50 is configured for transferring both the signal received via the second antenna arrangement 32 after down-conversion to the one or more first radio frequency bands 50 to the first radio frequency circuitry 20 and the signal received via the first antenna arrangement 30 in the one or more first radio frequency bands to the first radio frequency circuitry 20.

The apparatus comprises a node 70 at which the radio frequency path 50 meets with a second radio frequency path 82 to the second antenna arrangement 32 via the frequency converter 40 and a first radio frequency path 80 to the first antenna arrangement 30 not via the frequency converter 40.

In this example, the node 70 is a switch 72 or other selection means for selectively connecting the radio frequency path 50 to the second antenna arrangement 32 via the frequency converter 40 or to the first antenna arrangement 30 not via the frequency converter 40.

The switch 72 (and other switches described) can be any electrical or optical, or mechanical device that can switch between ports at the operational frequencies of the system. It could be one or more of the following: semiconductor switch, graphene switch, MEMs switch, relay, etc.

The switch 72 time-divides use of the single radio frequency path 50 between use by the first antenna arrangement 30 and use by the second antenna arrangement 32.

The first radio frequency circuitry 20 comprises a switch 52 or other selection means for selectively connecting the radio frequency path 50 to different radio frequency circuitry configured to process different ones or different sub-sets of the first radio frequency bands (RFB_1).

In this example, but not necessarily all examples, the switch 52 is configured to selectively connect the radio frequency path 50 to radio frequency circuitry 20 configured to process the n77 band or to radio frequency circuitry 20 configured to process the n79 band.

The frequency converter 40 comprises a receive path 41 and a transmit path 42. A switch 44 is used to selectively connect either the receive path 41 or the transmit path 42 to the second antenna arrangement 32.

The receive path 41 is configured as a super-heterodyne receiver. An oscillator signal, from local oscillator 46, is mixed with the received signal at the second radio frequency bands (RFB_2) and the mixed signal is filtered. The filtered signal at the first radio frequency bands (RFB_1) is provided to the node 70. The value of the local oscillator frequency controls the frequency difference between the received signal and the filtered signal. The frequency difference can be controlled and changed by programming the oscillating frequency provided by the local oscillator 46.

In some but not necessarily all examples in this document, a programmable local oscillator is enabled using a programmable frequency synthesizer which changes the frequency of the output of a fixed frequency local oscillator. In some examples a programmable frequency synthesizer is a phase locked loop synthesizer comprising in order an input node, an input counter, a phase comparator, a voltage-controlled oscillator and an output node that provides a feedback signal to the phase comparator via a feedback counter. The programmable relationship between the counters enables the frequency of the signal at the output node to be programmed. For example, the feedback counter can be a programmable counter.

In some but not necessarily all examples in this document, a local oscillator signal from one local oscillator at one location can be routed to another location to enable removal of a local oscillator at that other location.

The filter used for filtering can be a low pass or band pass filter as first radio frequency bands (RFB_1) are lower in frequency than the second radio frequency bands (RFB_2).

The receive path 41 comprises, in order, a switch 44 nearest the second antenna arrangement 32, an amplifier (e.g. a LNA), a band-pass filter for the second radio frequency bands (RFB_2), a mixer that receives the local oscillator signal from the local oscillator 46 and a band-pass filter for the first radio frequency bands (RFB_1) nearest the radio frequency path 50.

The transmit path 42 is configured as a super-heterodyne transmitter. An oscillator signal, from the local oscillator 46, is mixed with the transmission signal at the first radio frequency bands (RFB_1) and the mixed signal is filtered before transmission.

The value of the local oscillator frequency controls the frequency difference between the transmission signal and the filtered signal. The frequency difference can be controlled and changed by programming the oscillating frequency of the local oscillator 46.

The filter used for filtering can be a high pass or band pass filter as second radio frequency bands (RFB_2) are higher in frequency than the first radio frequency bands (RFB_1).

The transmit path 41 comprises, in order, a band-pass filter for the first radio frequency bands (RFB_1) closest to the radio frequency path 50, a mixer that receives the local oscillator signal from the local oscillator 46, a band-pass filter for the second radio frequency bands (RFB_2), a power amplifier and a switch 44 closest to the second antenna arrangement 32.

In this example the receive path 41 is connectable via the node 70 to the radio frequency circuitry 20. The transmit path 42 is not illustrated as connectable via the node 70 to transmission radio frequency circuitry in the radio frequency circuitry 20. However, in other examples, the transmit path is connectable via the node 70 to transmission radio frequency circuitry in the radio frequency circuitry 20.

FIGS. 4A, 4B, 4C, 4D illustrate different arrangements of switches 72 used at node 70.

The node 70 interconnects the radio frequency path 50 to the first radio frequency path 80 towards the first antenna arrangement 30 and the second radio frequency path 82 towards the second antenna arrangement 32.

Figure 4A:
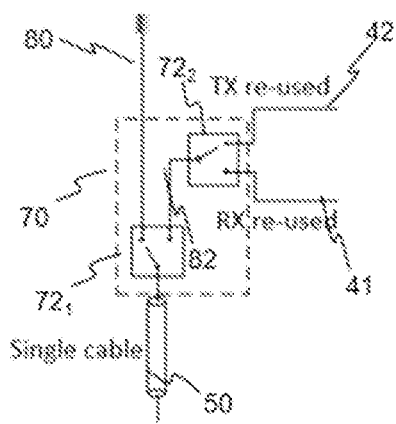
FIGS. 4A to 4D shows other examples of the subject matter described herein.

In FIG. 4A two switches 72 that are external to the frequency converter 40 are used to connect the radio frequency path 50 to the first radio frequency path 80 towards the first antenna arrangement 30, the second radio frequency path 82 towards the second antenna arrangement 32 (via the receive path 41) or the second radio frequency path 82 towards the second antenna arrangement 32 (via the transmit path 42).

A first single pole two-throw switch $72_1$ selects between whether the first radio frequency path 80 or the second radio frequency path 82 is connected to the radio frequency path 50.

A second single pole two-throw switch $72_2$ selects between whether the second radio frequency path 82 is connected to the receive path 41 or the transmit path 42.

Figure 4B:
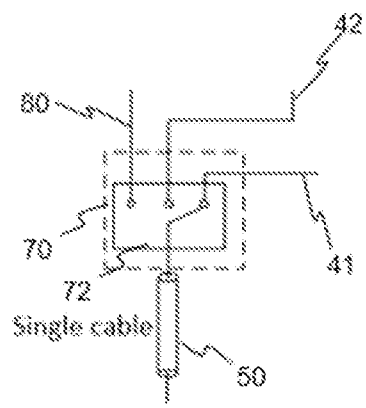

In FIG. 4B a single pole three-throw switch 72 that is external to the frequency converter 40 is used to connect the radio frequency path 50 to:
  i) the first radio frequency path 80 towards the first antenna arrangement 30, or
  ii) the second radio frequency path 82 towards the second antenna arrangement 32 (via the receive path 41);
  iii) the second radio frequency path 82 towards the second antenna arrangement 32 (via the transmit path 42).

Figure 4C:
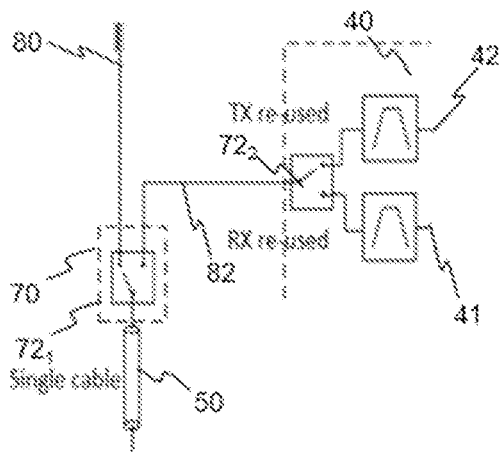

The arrangement of FIG. 4C is similar to that illustrated in FIG. 4A, except that while the first single-pole two-throw switch $72_1$ is external to the frequency converter 40, the second single-pole two-throw switch $72_2$ is now positioned within the frequency converter 40.

Figure 4D:
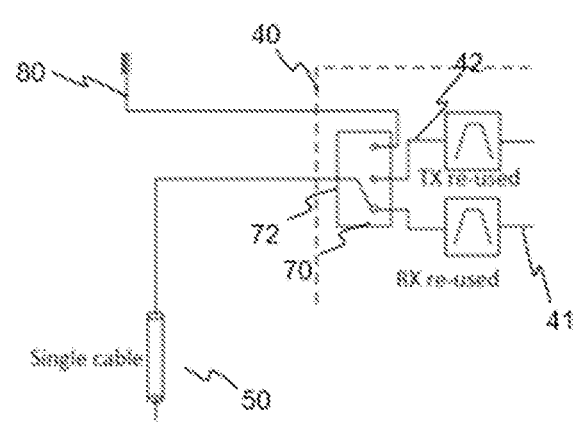

The arrangement of FIG. 4D is similar to that illustrated in FIG. 4B, except that the single-pole three-throw switch 72 is now positioned within the frequency converter 40.

The arrangements illustrated in FIGS. 4A, 4B, 4C, 4D enable three distinct states for use of the radio frequency path 50:
  transmission/reception via the first antenna arrangement 30 at one or more first radio frequency bands (RFB_1), or
  transmission via the second antenna arrangement 32 at one or more second radio frequency bands (RFB_2) (after up-conversion from the one or more first radio frequency bands (RFB_1)), or
  reception via the second antenna arrangement 32 at one or more second radio frequency bands (RFB_2) (after down-conversion from the one or more second radio frequency bands (RFB_2) to the one or more first radio frequency bands (RFB_1)).

FIGS. 5A, 5B illustrate different arrangements of nodes 70 comprising a combiner 76 and a switch 72 used at node 70.

The arrangements simultaneously connect, using combiner 76, the radio frequency path 50 to the second antenna arrangement 32 via the radio frequency converter 40 and to the first antenna arrangement 30 not via the frequency converter 40.

In FIG. 5A two switches 72 and a combiner 76 that are external to the frequency converter 40 are used to connect the radio frequency path 50 to:
i) only the first radio frequency path 80 towards the first antenna arrangement 30, or
ii) only the second radio frequency path 82 towards the second antenna arrangement 32 (via the transmit path 42) or
iii) via the combiner 76 to both the first radio frequency path 80 towards the first antenna arrangement 30 and the second radio frequency path 82 towards the second antenna arrangement 32 (via the receive path 41).

A first single-pole three-throw switch $72_1$ selects between whether
i) the combiner 76 is connected to the radio frequency path 50 (left throw);
ii) the second throw of a single-pole two-throw switch $72_2$ is connected to the radio frequency path 50 (centre throw);
iii) the second antenna arrangement 32 is connected to the radio frequency path 50 via transmit path 42 (right throw).

The combiner 76 connects to a first throw of the single pole two-throw switch $72_2$ and the second antenna arrangement 32 via the receive path 41.

The two-pole switch $72_2$ selects between whether the combiner 76 or the centre pole of the switch $72_1$ is connected to the first radio frequency path 80.

The centre throw of the switch $72_1$ enables transmission or transmission/reception via the first antenna arrangement 30 at one or more first radio frequency bands (RFB_1).

The right throw of the switch $72_1$ enables transmission via the second antenna arrangement 32 at one or more second radio frequency bands (RFB_2), The left throw of the switch $72_1$ enables reception via the first antenna arrangement 30 at one or more first radio frequency bands (RFB_1), subject to the state of switch $72_2$, and via the second antenna arrangement 32 at one or more second radio frequency bands (RFB_2).

The arrangements illustrated in FIGS. 5A, 5B enable three distinct states for use of the radio frequency path 50:
transmission or transmission/reception via the first antenna arrangement 30 at one or more first radio frequency bands (RFB_1), or
transmission via the second antenna arrangement 32 at one or more second radio frequency bands (RFB_2), or
reception via the first antenna arrangement 30 at one or more first radio frequency bands (RFB_1) and via the second antenna arrangement 32 at one or more second radio frequency bands (RFB_2).

The arrangement of FIG. 5B is similar to that illustrated in FIG. 5A, except that the switches 72 and the combiner 76 are now positioned within the frequency converter 40.

It can be seen that in the examples of FIGS. 4A-4D and 5A-5B that transmission in the one or more first radio frequency bands (RFB_1) and transmission in the one or more second radio frequency bands (RFB_2) are separated.

Reception in the one or more first radio frequency bands (RFB_1) and reception in the one or more second radio frequency bands (RFB_2) can be separated or can be combined.

Referring back to FIG. 3, the apparatus 10 can therefore comprise first radio frequency circuitry 20 configured for operation at least in one or more first radio frequency bands (RFB_1);
a frequency converter 40 for converting a frequency of a signal for transmission via the second antenna arrangement 32 from one or more first radio frequency bands (RFB_1) to one or more second radio frequency bands (RFB_2);
selection means 70 for connecting the first radio frequency circuitry 20 via the radio frequency path 50 to the second antenna arrangement 32 via the frequency frequency converter 40 or to the first antenna arrangement 30 not via the frequency converter 40.

The frequency converter 40 can be programmable.

As previously described frequency converter 40 can be programmable to convert a frequency of a signal received via the second antenna arrangement 32, in one of the second radio frequency bands (RFB_2), to a selected one or more first radio frequency bands (FRB_1).

The selected one or more first radio frequency bands (RFB_1) can be selected because it (or they) are available radio frequency band(s) at the first radio frequency circuitry 20.

In some but not necessarily al examples, the frequency converter 40 can be programmable to convert a frequency of a signal generated in one or more first radio frequency bands (FRB_1) to a selected one or more second radio frequency bands (RFB_2) before transmission via the second antenna arrangement 32.

As illustrated in FIG. 6, in at least some examples, but not necessarily all examples, the selected one or more first radio frequency bands are selected 202 at a network 200 and communicated 203 to the apparatus 10 from the network 200. The selected one or more first radio frequency bands can be selected because it (or they) are available radio frequency band(s) at the apparatus 10.

In this example, but not necessarily all examples, the selection 202 at a network 200 is dependent upon information transmitted 201 to the network 200 by the apparatus 10. The apparatus 10 is configured to transmit 201 to the network 200 information identifying capability or capabilities of the apparatus 10 to support network selection 202 of the selected first radio frequency band. For example, the information can identify capability or capabilities of the first radio frequency receiver circuitry 20 and of other receiver and/or transmitter circuitry 20 at the apparatus 10.

In at least some examples, but not necessarily all examples, the selected one or more first radio frequency bands are selected at the apparatus 10. In some examples this can be after receiving information from the network 200 or after an exchange of information with the network 200.

In the various examples, the selected one or more first radio frequency bands are selected based upon occupation/use of radio frequency bands.

The third-generation partnership project 3GPP defines various radio frequency bands in the specification 3GPP TS 38.101-3. These bands will be used for the purpose of illustrating examples of implementation but other radio frequency bands could be used.

In 3GPP, the first frequency region (FR1) has a range 0.410-7.125 GHz and includes, for example, bands n77 (3.3 GHz-4.2 GHz) and bands n79 (4.4 GHz-5.0 GHz). The second frequency range (FR2) has a range 24.250-52.6 GHz and includes, for example, bands n257 (26.5 GHz-29.5 GHz), bands n258 (24.25 GHz-27.5 GHz), and bands n261 (27.5 GHz-28.35 GHz).

The bands n77, n79, n257, n258, n261 have certain commonalities. For example, they each support subcarrier spacing (SCS) of 60 kHz. For example, they each support a bandwidth of 50 and 100 MHz. In these examples, down conversion of n257, n258 or n261 signals can not only place those signals within the bands n77, n79 but can also place them within those bands with commonality of SCS and bandwidth. This can simplify demodulation. For example, a FR1 receiver can treat the received signals as if they are contiguous or non-contiguous carrier aggregation.

This also means that a dedicated FR2 receiver can be spared.

Example 1: Band n257 is required for downlink traffic. Band n77 is unoccupied by the user equipment 10/network 200. The user equipment 10 uses a n77 receiver 20 and down-converts 40 the n257 channel (higher frequencies) onto n77 channel (lower frequencies).

Example 2: Band n257 is required for downlink traffic. Band n77 is also in use. The traffic on band n77 has a bandwidth 20 MHz while the traffic on n257 has a bandwidth 50 MHz. The n77 receiver can decode both signals simultaneously, provided the n257 channel is down-converted into a portion of the n77 frequency band that is unoccupied to the user equipment 10.

Example 3: Band n257 is required for downlink traffic. Band n77 is running 60 MHz contiguous carrier aggregation. Down-converting n257 to be within the n77 band will be beyond the capabilities of the n77 receiver. The downlink traffic on the n257 band must be routed to a n257 receiver for parallel n257 reception by the n257 receiver and n77 reception by the n77 receiver.

In all the examples, the user equipment 10 can be configured to choose how it should deal with the down-conversion relative to its capabilities and free receiver bandwidth.

Different user equipment 10 can have different capabilities. Some may support FR1-FR2 Inter-band carrier aggregation whereas other will not. Some may support FR1-FR2 inter-band carrier aggregation such as, for example, one or more of CA_n77(2A)-n257A, CA_n77C-n257A, CA_n77A-n79A-n257A, CA_n77A-n257A.

Some user equipment (UE) 10 may support 5G NR FR2 as standalone (SA), or non-standalone (where FR2 is aggregated on to an FR1 band, which serves as the control channel). Thus, capabilities for simultaneous FR1 and FR2 operation may depend on: the capability list reported by the UE of supported radio resource combinations and the grant from the network for standalone/non-standalone and therefore also carrier aggregation grant.

In some examples, the UE 10 can allow non-standalone (NSA) operation aggregating CA_n79A_n257A, which the UE 10 could do with a single receive chain by placing the n257A channel next to the n79A channel and decode the signal as contiguous or non-contiguous carrier aggregation (CA).

Figure 7:
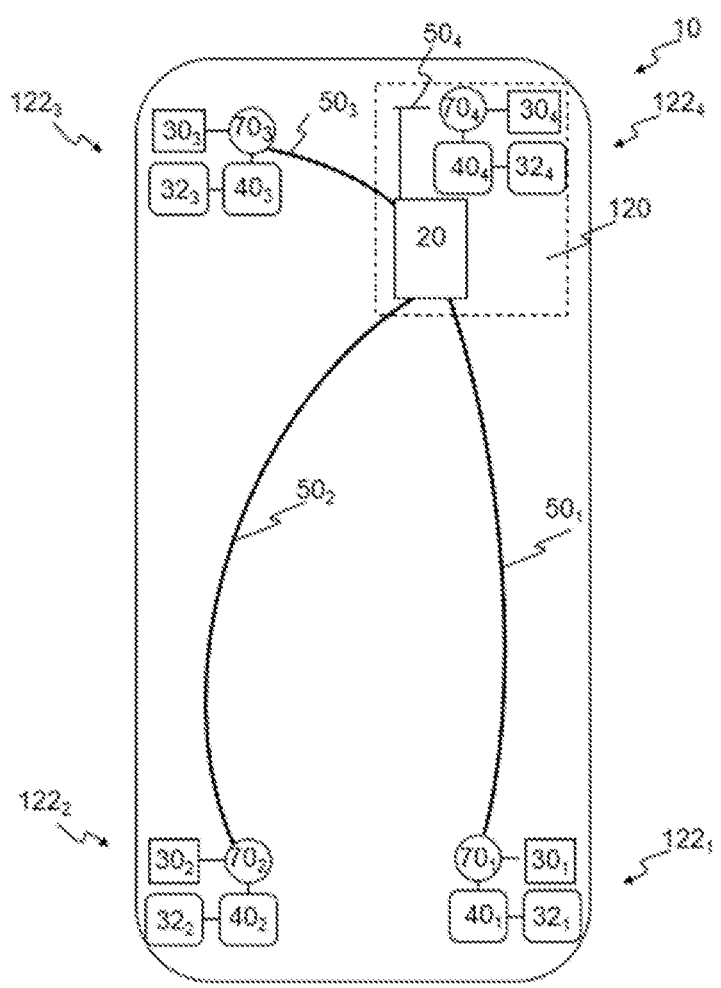
FIG. 7 shows another example of the subject matter described herein.

Alternately the FR2 channel can simply be down-converted onto an FR1 n77 receive chain that is currently unused provided n77 is either off or n77 has available MIMO receive paths FIG. 7 illustrates an example of an apparatus 10 as described previously. In this example the apparatus 10 is a user equipment. In this example the apparatus 10 is a hand-held apparatus, for example a mobile phone.

The FIG illustrates a plurality of spatially diverse first antenna arrangements 30 and a plurality of spatially diverse second antenna arrangements 32.

At least some of the plurality of spatially diverse first antenna arrangements 30 and the plurality of spatially diverse second antenna arrangements 32 are paired. At least some of the paired first antenna arrangements 30 and second antenna arrangements 32 are served by a single radio frequency path 50 as previously described.

The radio frequency path $50_i$ extends from the radio frequency transceiver circuitry 20 to a respective diverse location $122_i$ where a pair comprising a first antenna arrangement $30_i$ and a second antenna arrangements $32_i$ are located.

The radio frequency transceiver circuitry 20 is configured for operation in the first radio frequency bands (RFB_1).

At each diverse location $122_i$, there is a first antenna arrangement $30_i$ configured for operation in the first radio frequency bands (RFB_1) and a second antenna arrangement $32_i$ configured for operation in the second radio frequency bands (RFB_2).

A frequency converter $40_i$ is configured to convert signals between frequencies in the second radio frequency bands (RFB_2) and the first radio frequency bands (RFB_1). The radio frequency path $50_i$ to the radio frequency transceiver circuitry 20 is configured for transferring a signal in the first radio frequency bands (RFB_1) via the node $70_i$.

For example, a frequency down-converter $40_i$ is configured to convert a frequency of a signal received via the second antenna arrangement $32_i$, in the second radio frequency bands (RFB_2), to the first radio frequency bands (RFB_1). The radio frequency path $50_i$ to the radio frequency transceiver circuitry 20 is configured via the node $70_i$ for transferring the signal received via the second antenna arrangement $32_i$ after down-conversion to the first radio frequency bands and for transferring a signal received via the first antenna arrangement $30_i$ in the first radio frequency bands.

Also illustrated is a printed circuit board (PCB) 120 for the radio frequency transceiver circuitry 20, configured for operation in the first radio frequency bands (RFB_1). The PCB 120 connects to the first and second antenna arrangements $30_4$, $32_4$ at the diverse location $122_4$ via the radio frequency path $50_4$. The radio frequency path $50_4$ is an interconnect on the PCB 120.

The PCB 120 could take up all or a majority of the surface area within the boundary of an apparatus housing the PCB 120 (for example user equipment), and the coaxial cables 50_1 to 50_3 could be replaced with alternative transmission line types, for example, at least one of: a stripline, a microstrip line, a co-planar waveguide (CPW), a PCB designed using "vias" to create a coaxial-like transmission line, a microwave waveguide, etc. In this case the transceiver 20 may still be located close to one of the locations 122.

The radio frequency paths $50_1$, $50_2$, $50_3$ to the respective other diverse locations $122_1$, $122_2$, $122_3$ are, in this example, coaxial cables.

In FIGS. 8 to 12, each radio frequency path 50, has its own associated receiver circuit $20_{Ri}$. In the examples illustrated the receiver circuits $20_{Ri}$ for each radio frequency path $50i$ can operate as a n77 receiver and a n79 receiver.

The transmitter circuitry $20_{T1}$ can be shared by the radio frequency paths $50_i$. The receiver circuitry $20_{R1}$ can be shared by the radio frequency paths $50_i$. The receiver circuitry $20_{R2}$, $20_{R3}$, $20_{R4}$ are not shared. The receiver circuitry $20_{R2}$ can be used by radio frequency path $50_2$ only. The receiver circuitry $20_{R3}$ can be used by radio frequency path $50_3$ only. The receiver circuitry $20_{R4}$ can be used by radio frequency path $50_4$ only.

Switches $120_i$ are used to control what is connected to a radio frequency path $50_i$.

The receiver circuitry $20_{R1}$, $20_{R2}$, $20_{R3}$, $20_{R4}$ can be used in parallel by respective radio frequency paths $50_1$, $50_2$, $50_3$, $50_4$.

The transmitter circuitry $20_{T1}$ can be used by one of the respective radio frequency paths $50_1$, $50_2$, $50_3$, $50_4$.

In the examples illustrated the transmitter circuitry $20_{T1}$ can operate as a n77 transmitter and a n79 transmitter. The transmitter circuitry $20_{T1}$ is used in combination with a duplex filter that separates n77 from n79.

In the examples illustrated the receiver circuitry $20_R$, can operate as a n77 receiver and a n79 receiver. The receiver circuitry $20_{Ri}$ is used in combination with a duplex filter that separates n77 from n79.

Switches 120*i* are used to control which one of the radio frequency paths 50, is connected to the transmitter circuit $20_{T1}$.

The switches $120_2$, $120_3$, $120_4$ have a single pole and 3 throws. The single pole of switch $120_j$ (j=2, 3, 4) is connected to the respective radio frequency path $50_j$. There is a throw for each of the respective two receiver circuits $20_R$, and one for the switch $120_1$ that controls access to the transmitter circuit $20_{T1}$.

The switch $120_1$ has 2 poles and each pole has four throws. One pole is connected for n77 channel. and one pole is connected for n79 channel. The transceiver includes transmitter circuit $20_{T1}$ and receiver circuit $20_{R1}$. The throws are shared by the poles. There is a throw for the radio frequency path $50_1$ and a throw to each of the switches $120_j$ (j=2, 3, 4). The throw to each of the switches $120_j$ (j=2, 3, 4) provides a route from a transmitter circuit $20_{T1}$ to any of the radio frequency paths $50_j$ (j=2, 3, 4). The transmitter $20_{T1}$ may be used for transmission on either frequency band of n77 or n79 directed towards all antennas $30_1$ $30_2$ $30_3$ $30_4$ and the receiver $20_{R1}$ is one of the 4 available receivers of the radio frequency apparatus 20 that connects to antenna $30_1$.

Arrangement of the nodes $70_i$ is similar to that described in relation to FIG. 4A. Other arrangements are possible as previously described.

There are multiple first antenna arrangements $30_i$ configured for operation in one or more first radio frequency bands (RFB_1) where the multiple first antenna arrangements 30 are spatially diverse.

There is a switching arrangement 120 configured to connect the multiple first antenna arrangements $30_i$ to the first radio frequency transmitter circuitry $20_{T1}$ and, optionally, the first radio frequency receiver circuitry $20_{R1}$.

The switching arrangement 120 is also configured to connect the multiple first antenna arrangements $30_i$ to respective first radio frequency receiver circuitry $20_{Ri}$.

There are multiple second antenna arrangements $32_i$ configured for operation in one or more second radio frequency bands (RFB_2) wherein the multiple second antenna arrangements 32 are spatially diverse.

The switching arrangement 120 is configured to connect any of the multiple second antenna arrangements $32_i$ to the first radio frequency transmitter circuitry $20_{T1}$ and, optionally, the first radio frequency receiver circuitry $20_{R1}$.

The switching arrangement 120 is configured to connect the multiple second antenna arrangements $32_i$ to respective first radio frequency receiver circuitry $20_{Ri}$.

The differences between FIGS. 8 to 12 will now be described.

In each FIG, transmission and reception in the first radio frequency bands (RFB_1) is via the combinations of first antenna arrangements $30_i$, nodes $70_i$ and radio frequency path $50_i$.

However, transmission/reception in the second radio frequency bands (RFB_2) via the second antenna arrangements $32_i$ is different in the FIGS.

Figure 8:
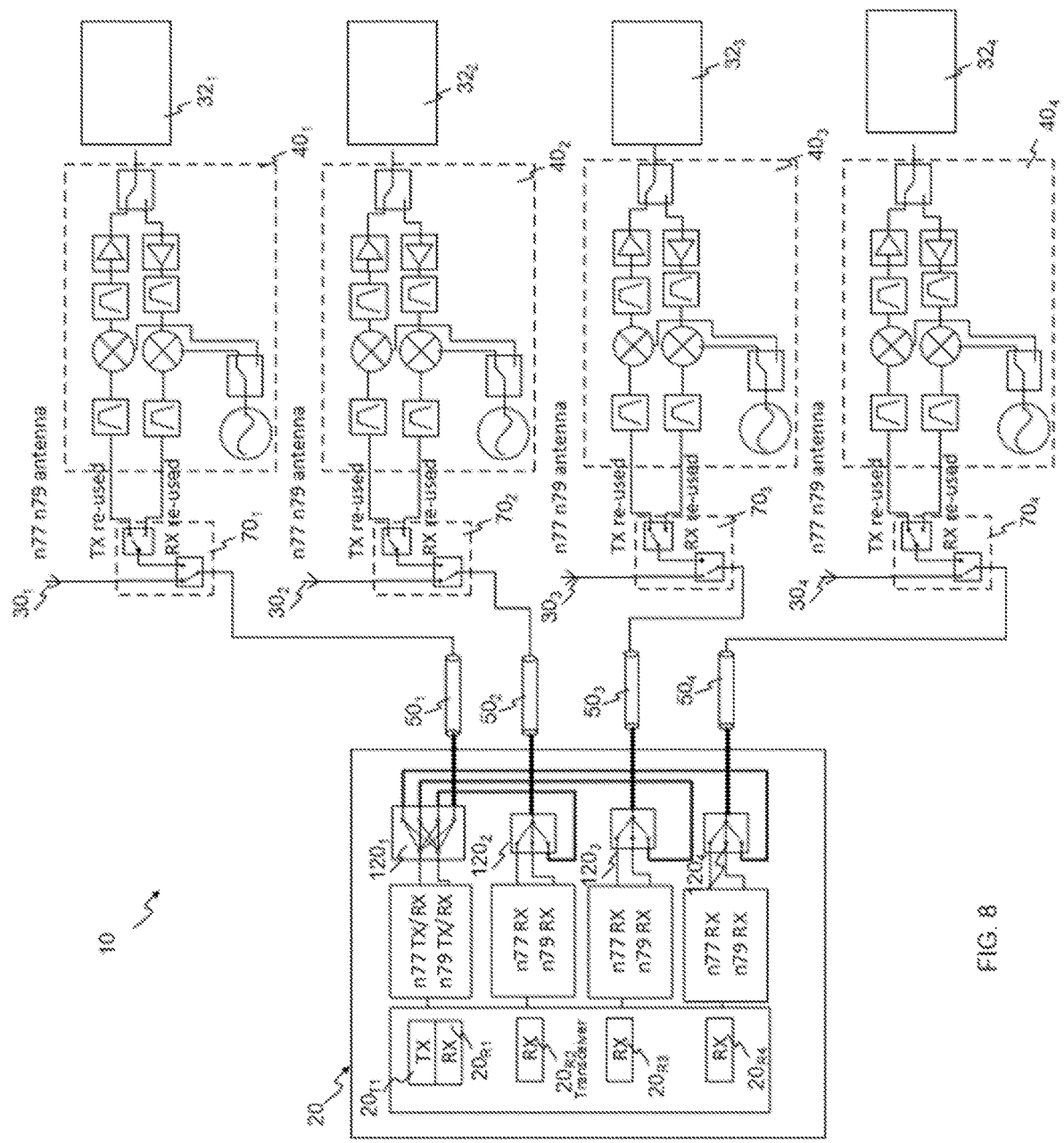
FIG. 8 shows another example of the subject matter described herein.

In FIG. 8, there is no reception or transmission circuitry configured for operation in the second radio frequency bands (RFB_2). Transmissions for the second radio frequency bands (RFB_2) are created in a first radio frequency band (RFB_1) at transmitter $20_{T1}$ and then routed onto one of the respective radio frequency paths $50_i$ by switch $120_1$ and $120_i$ and then via node $70_i$ to the frequency converter $40_i$, for up-conversion to the second radio frequency bands (RFB_2) and transmission via the second antenna arrangement $32_i$.

Receptions for the second radio frequency bands (RFB_2) are received at the second antenna arrangement $32_i$, down-converted at the frequency converter $40_i$ to the first radio frequency bands (RFB_1) and then routed onto the respective radio frequency path $50_i$ by node $70_i$ and then by switch $120_i$ to receiver $20_{Ri}$ or, optionally by switches $120_i$ and $120_1$ to receiver $20_{R1}$.

Figure 9:
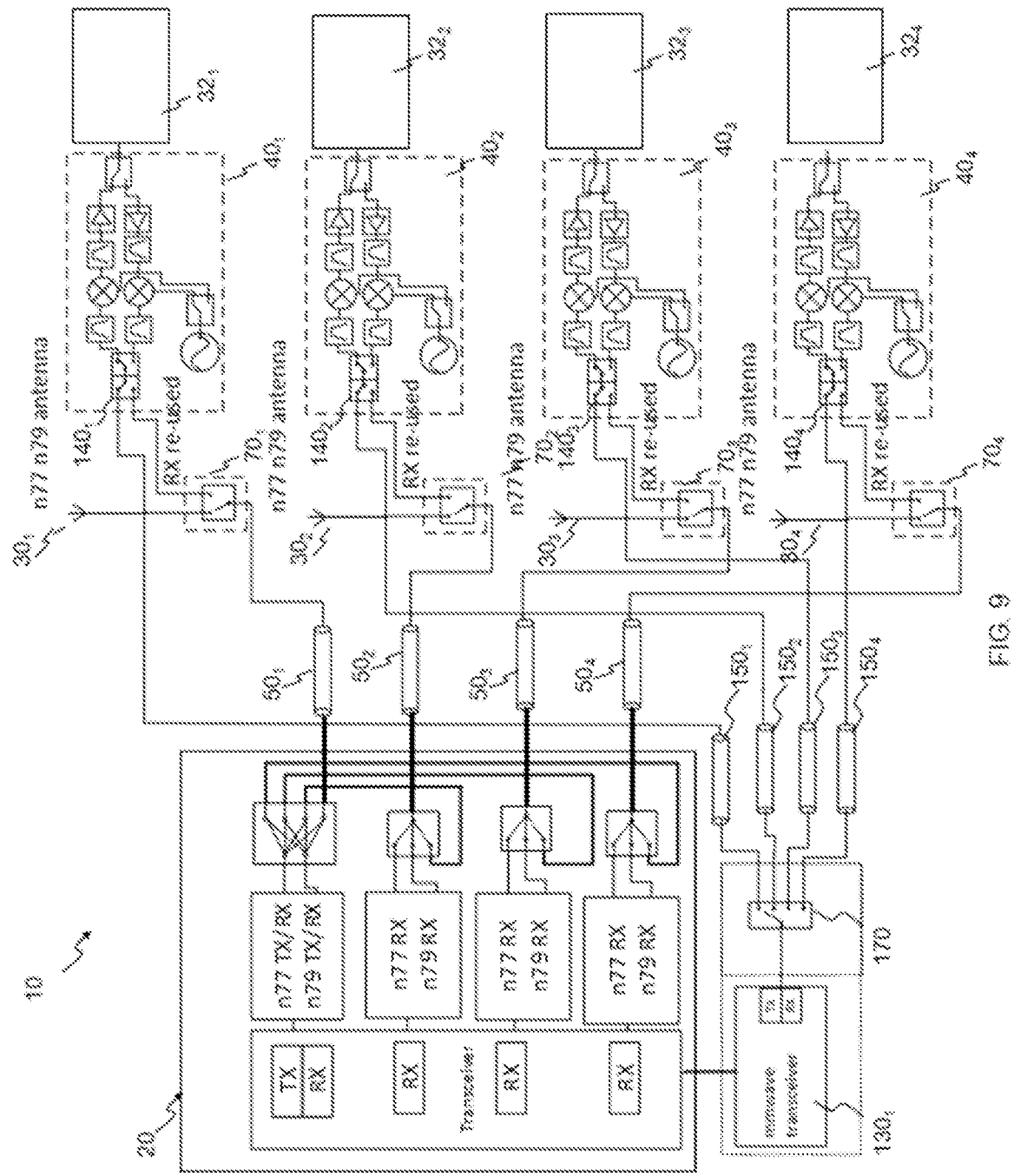
FIG. 9 shows another example of the subject matter described herein.

In FIG. 9, 10, 11 the apparatus 10 has the same functionality as described for FIG. 8, however, the apparatus 10 additionally has reception and/or transmission circuitry 130 configured for operation in the second radio frequency bands (RFB_2). Transmissions for the second radio frequency bands (RFB_2) can be enabled in the first radio frequency band (RFB_1) as described for FIG. 8 or in the second radio frequency band (RFB_2) by a transceiver 130 configured for operation in the second radio frequency bands (RFB_2).

Receptions for the second radio frequency bands (RFB_2) can be processed in the first radio frequency band (RFB_1) as described for FIG. 8 or in the second radio frequency band (RFB_2) (or in a related intermediate frequency) by a transceiver 130 configured for operation in the second radio frequency bands (RFB_2).

Each of the second antenna arrangements $32_i$ is connected or connectable to a transceiver 130 configured for operation in the second radio frequency bands (RFB_2) via a respective second radio frequency path 150*i*. The second radio frequency paths 150*i* can be configured for operation at the second radio frequency bands (RFB_2). The second radio frequency paths 150*i* can be coaxial cables or other type radio frequency transmission line as mentioned above.

Figure 10:
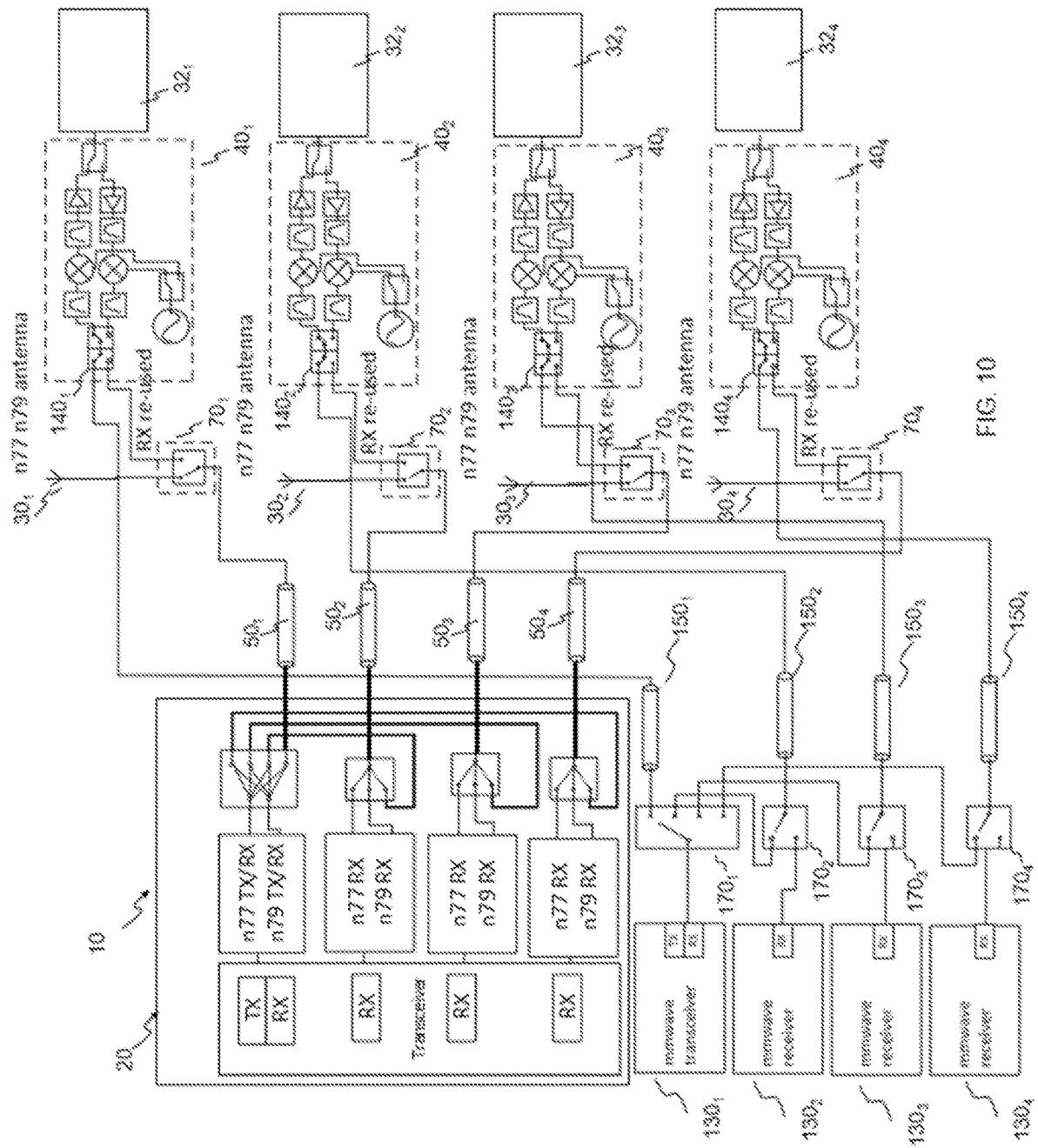
FIG. 10 shows another example of the subject matter described herein.
Figure 11:
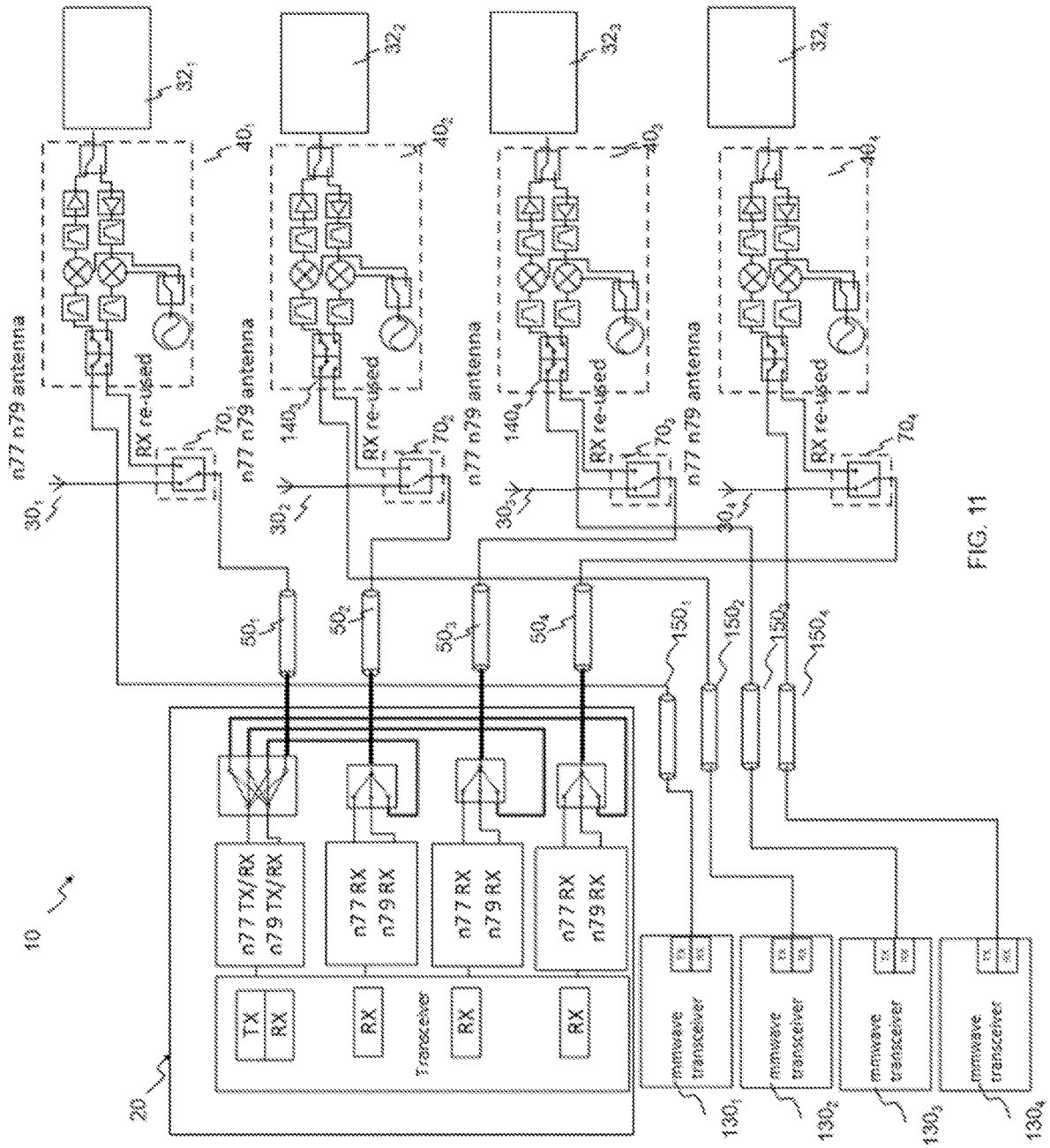
FIG. 11 shows another example of the subject matter described herein.

The apparatuses 10 illustrated in FIGS. 9, 10, 11 can therefore comprise switching arrangements $140_i$ for switching the second antenna arrangement $32_i$ from being used by the first radio frequency circuitry 20 to being used by second radio frequency circuitry 130.

In some but not necessarily all examples, the switching arrangement 140 is configured to switch the second antenna arrangement 32 from being used by the first radio frequency circuitry 20 to being used by the second radio frequency circuitry 130 in response to satisfaction of a switch condition, wherein the switch condition is: completion of initial access and beam management for the second radio frequency bands; or complexity of the signal received in the second radio frequency bands exceeds a complexity threshold.

The completion of initial access and beam management for the second radio frequency bands can be used to determine what beam is used in downlink.

The complexity threshold could be exceeded, for example, if the subcarrier spacing (SCS) or bandwidth requirements exceed those of the first radio frequency circuitry 20.

In some examples, the capabilities of the first radio frequency circuitry 20 can be extended beyond those required for the first radio frequency bands (RFB_1) to include some or all capabilities (e.g., subcarrier spacing SCS, bandwidth) that could be required by the second radio frequency bands (RFB_2) but are not required by the first radio frequency bands (RFB_1).

Thus, it is possible for transmission and/or reception in the second radio frequency bands (RFB_2) to occur initially using the radio frequency circuitry 20 configured for the first radio frequency bands (RFB_1) and then subsequently to switch to using the radio circuitry 130 configured for the second radio frequency bands (RFB_2) for transmission and/or reception in the second radio frequency bands (RFB_2). This delay in powering up and using the radio frequency circuitry 130 configured for the second radio frequency bands (RFB_2) saves energy.

In FIG. 9, each of the second antenna arrangements $32_i$ is connectable to a transceiver 130 configured for operation in the second radio frequency bands (RFB_2) via a single pole multiple throw switch 170 to respective second radio frequency paths 150$i$. The single transceiver 130 is shared by the second radio frequency paths $150_i$ to the respective second antenna arrangements $32_i$.

The switch 170 is an example of a switching arrangement configured to connect the multiple second antenna arrangements $32_i$ to the second radio frequency circuitry $130_1$.

In FIG. 10, each of the second antenna arrangements $32_i$ is connectable to a transceiver $130_1$ configured for operation in the second radio frequency bands (RFB_2) via a single pole multiple throw switch $170_1$ to respective second radio frequency paths 150$i$. The transceiver $130_i$ is shared by the second radio frequency paths 150$i$ to the second antenna arrangements $32_i$.

The switch $170_1$ is an example of a switching arrangement configured to connect the multiple second antenna arrangements $32_i$ to the second radio frequency circuitry $130_1$.

In FIG. 10, each of the second antenna arrangements 32 (j=2, 3, 4) is connectable, via a single pole dual throw switch $170_j$, to either a receiver $130_{Rj}$ configured for operation in the second radio frequency bands (RFB_2) or a throw of the switch $170_1$.

In FIG. 11, each of the second antenna arrangements $32_i$ is connected to a respective radio transceiver $130_i$ configured for operation in the second radio frequency bands (RFB_2) via a respective second radio frequency path $150_i$. The radio transceiver $130_1$ is not shared by the second radio frequency paths $150_i$ to the second antenna arrangements $32_i$.

Figure 12:
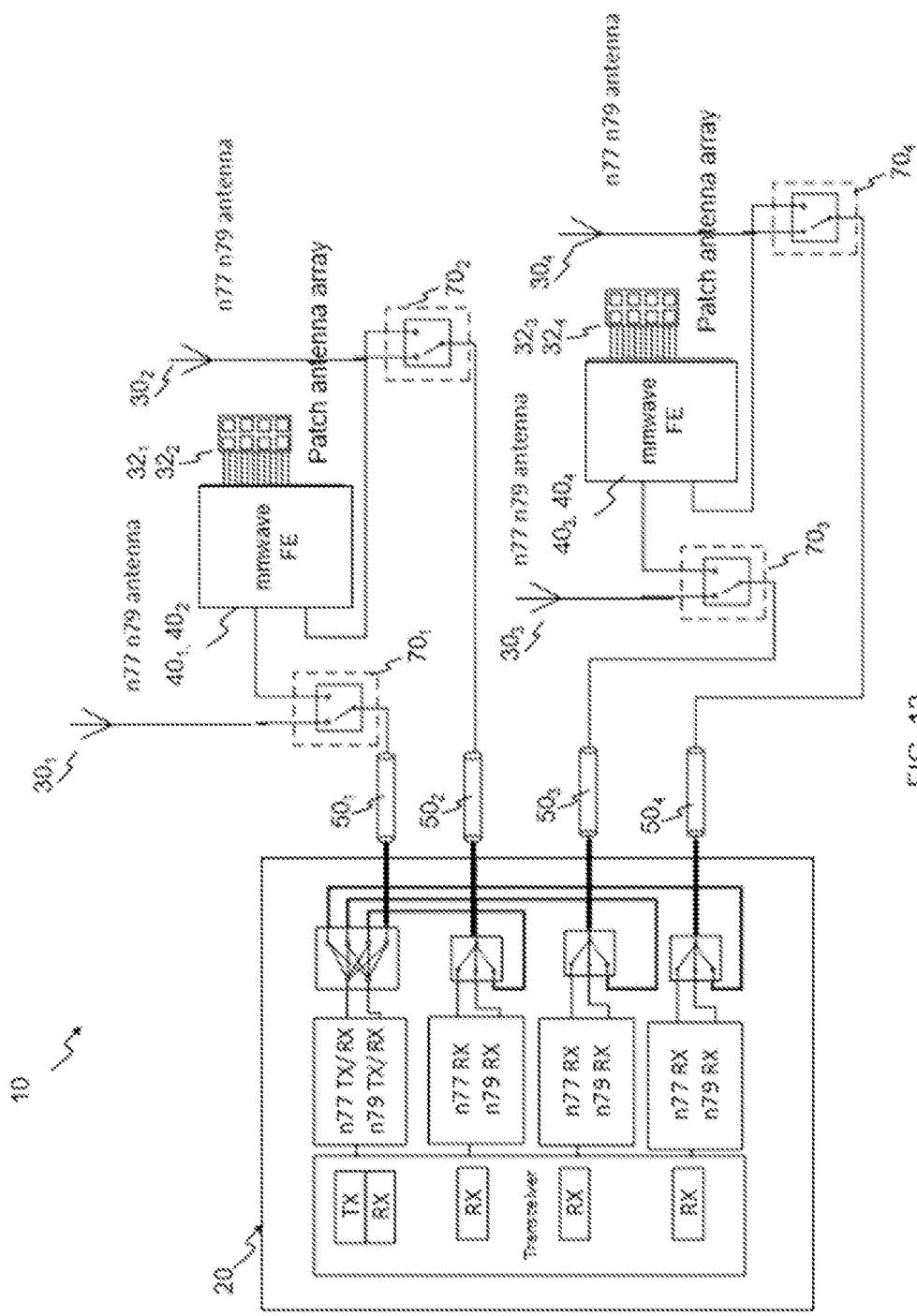
FIG. 12 shows another example of the subject matter described herein.

In FIG. 12 there are two second antenna arrangements $32_i$ one for each linear polarization, at each location. The antenna arrangements $32_i$ are as previously described.

Each dual polarized antenna arrangement 32 is connected to two radio frequency paths 50, one for each second antenna arrangement 32. The dual polarized antenna arrangements $32_1$, $32_2$ are connected to respective radio frequency paths $50_1$, $50_2$ one for each second antenna arrangement $32_1$, $32_2$. The dual polarized antenna arrangements $32_3$, $32_4$ are connected to respective radio frequency paths $50_3$, $50_4$ one for each second antenna arrangement $32_3$, $32_4$.

This can enable 2×2 MIMO in the same direction.

In any of the preceding examples, the apparatus 10 can be configured to receive and/or transmit signals in the first radio frequency bands (RFB_1) and signals in the second radio frequency bands (RFB_2) that have a common frame structure. For example, 10 sub-frames of duration 1 ms per frame of 10 ms. The number of slots per frame can be variable (for example depends upon subcarrier spacing SCS). The slot length can be variable with a fixed number of OFDM symbols per slot.

In any of the preceding examples, the first radio frequency bands (RFB_1) are within a first frequency range (FR1) below 10 GHz and the second radio frequency bands (RFB_2) are within a second frequency range (FR2) above 20 GHz. For example, FR1 can be below 8 GHz (e.g., 0.410-7.125 GHz) and can include bands n77 (3.3 GHz-4.2 GHz) and n79 (4.4 GHz-5.0 GHz). For example, FR2 can be above 24 Ghz (e.g., 24.250-52.6 GHz) and can include n257 (26.5 GHz-29.5 GHz).

In any of the preceding examples, the first radio frequency bands (RFB_1) and the second radio frequency bands (RFB_2) can have in common 60 kHz subcarrier spacing SCS and 50 MHz, 100 MHz bandwidth.

In any of the preceding examples, the first radio frequency bands (RFB_1) can be specified by a telecommunications standard and/or an international agreement.

In any of the preceding examples, the second radio frequency bands (RFB_1) can be specified by the telecommunications standard and/or the international agreement.

In the preceding examples, reference has been made to the apparatus 10. The apparatus 10 can be modular.

For example, a module for use in the apparatus 10 can comprise the second antenna arrangement 32 configured for operation in one or more second radio frequency bands; and the frequency converter 40. The frequency converter 40 can be configured to convert a frequency of a signal 33 received via the second antenna arrangement 32, in one or more second radio frequency bands (RFB_2), to one or more first radio frequency bands (RFB_1).

Where a structural feature has been described, it may be replaced by means for performing one or more of the functions of the structural feature whether that function or those functions are explicitly or implicitly described.

Radio frequency circuitry and the antenna arrangements have been described as configured to operate in one or more operational frequency bands. For example, the operational frequency bands may include (but are not limited to) the bands specified in the current release of 3GPP TS 36.101.

An operational frequency band is a frequency band over which the component can efficiently operate, that is, is a frequency range where the component's return loss (−20 log 10|S11|) is more negative than an operational threshold and the insertion loss (−20 log 10|S21|) is less negative than an operational threshold value.

As used here 'module' refers to a unit or apparatus that excludes certain parts/components that would be added by an end manufacturer or a user.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services. Any of these can be or can comprise the apparatus 10.

The apparatus 10 can be comprised in any of: a portable electronic device, a hand-portable electronic device, a human body wearable electronic device, a radio device installed in a vehicle (automobile, boat/vessel, aircraft, drone, etc), a mobile phone, a smartphone, a tablet, etc.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
    first radio frequency receiver circuitry configured for operation at least in one or more first radio frequency bands;
    at least a first antenna arrangement configured for operation in the one or more first radio frequency bands;
    at least a second antenna arrangement configured for operation in one or more second radio frequency bands;
    a frequency down-converter for converting a frequency of a signal received via the second antenna arrangement, in one or more second radio frequency bands, to the one or more first radio frequency bands;
    a radio frequency path to the first radio frequency receiver circuitry that is configured for transferring the signal received via the second antenna arrangement after down-conversion to the one or more first radio frequency bands and for transferring a signal received via the first antenna arrangement in the one or more first radio frequency bands; and
    at least one of (i) a switch for selectively connecting the radio frequency path to the second antenna arrangement via the frequency down converter or to the first antenna arrangement not via the frequency down-converter or (ii) a combiner configured to simultaneously connect the radio frequency path to the second antenna arrangement via the frequency down-converter and to the first antenna arrangement not via the frequency down-converter.

2. An apparatus as claimed in claim 1, comprising a node at which the radio frequency path meets with a second radio frequency path to the second antenna arrangement via the frequency down-converter and a first radio frequency path to the first antenna arrangement not via the frequency down-converter, wherein a length of the radio frequency path between the node and the first radio frequency receiver circuitry is at least an order of magnitude greater than a length of the first radio frequency path and at least an order of magnitude greater than a length of the second radio frequency path.

3. An apparatus as claimed in claim 1, wherein the frequency down-converter is programmable to convert a frequency of a signal received via the second antenna arrangement, in one of the second radio frequency bands, to one or more selected first radio frequency bands.

4. An apparatus as claimed in claim 3, wherein the one or more selected first radio frequency bands is selected because it is an available radio frequency band at the first radio frequency receiver circuitry.

5. An apparatus as claimed in claim 4, wherein the one or more selected first radio frequency bands is selected at a network and communicated to the apparatus from the network.

6. An apparatus as claimed in claim 5, configured to transit information identifying capability or capabilities of at least the first radio frequency receiver circuitry to the network to support network selection of the one or more selected first radio frequency bands.

7. An apparatus as claimed in claim 1, comprising:
first radio frequency transmitter circuitry configured for operation at least in one or more first radio frequency bands;
a frequency up-converter for converting a frequency of a signal for transmission via the second antenna arrangement from one or more first radio frequency bands to one or more second radio frequency bands; and
a switch for connecting the first radio frequency transmitter circuitry via the radio frequency path to:
the second antenna arrangement via the frequency up converter or to the first antenna arrangement not via the frequency up-converter.

8. An apparatus as claimed in claim 1 comprising:
at least second radio frequency receiver circuitry configured for operation at least in one or more second radio frequency bands; and
a switching arrangement for switching the second antenna arrangement from being used by the first radio frequency receiver circuitry to being used by the second radio frequency receiver circuitry.

9. An apparatus as claimed in claim 8, wherein the switching arrangement is configured to switch the second antenna arrangement from being used by the first radio frequency receiver circuitry to being used by the second radio frequency receiver circuitry in response to satisfaction of a switch condition, wherein the switch condition is:
completion of initial access and beam management for the second radio frequency bands; or
complexity of the signal received in the second radio frequency bands exceeds a complexity threshold.

10. An apparatus as claimed in claim 1, wherein the first radio frequency bands are in a first frequency range (FR1) below 10 GHz and the second radio frequency bands are in a second frequency range (FR2) above 20 GHz.

11. An apparatus as claimed in claim 1, wherein at least a portion of the radio frequency path is provided by a coaxial cable configured for transferring a signal received via the second antenna arrangement, after down-conversion to the one or more first radio frequency bands, and for transferring a signal received via the first antenna arrangement in the one or more first radio frequency bands.

12. An apparatus as claimed in claim 1 configured as mobile equipment or user equipment.

13. A module for use in the apparatus of claim 1 comprising:
the second antenna arrangement configured for operation in one or more second radio frequency bands; and
the frequency down converter for converting a frequency of a signal received via the second antenna arrangement, in one or more second radio frequency bands, to one or more first radio frequency bands.

14. An apparatus comprising:
radio frequency circuitry configured for operation at least in one or more first radio frequency bands;
a first antenna arrangement configured for operation in the one or more first radio frequency bands;
a second antenna arrangement configured for operation in one or more second radio frequency bands;
a radio frequency path configured to enable transfer of a signal in the one or more first radio frequency bands between the radio frequency circuitry and the first antenna arrangement and also between the radio frequency circuitry and the second antenna arrangement;
a frequency converter positioned between the radio frequency path and the second antenna arrangement configured to enable, for a signal, frequency conversion between the one or more second radio frequency bands and the one or more first radio frequency bands; and
at least one of (i) a switch for selectively connecting the radio frequency path to the second antenna arrangement via the frequency converter or to the first antenna arrangement not via the frequency-converter or (ii) a combiner configured to simultaneously connect the radio frequency path to the second antenna arrangement via the frequency converter and to the first antenna arrangement not via the frequency converter.

15. An apparatus as claimed in claim 14, wherein the frequency converter is programmable to convert a frequency of a signal received via the second antenna arrangement, in one of the second radio frequency bands, to one or more selected first radio frequency bands.

16. An apparatus as claimed in claim 14, comprising:
first radio frequency transmitter circuitry configured for operation at least in one or more first radio frequency bands;
a frequency up-converter for converting a frequency of a signal for transmission via the second antenna arrangement from one or more first radio frequency bands to one or more second radio frequency bands; and
a switch for connecting the first radio frequency transmitter circuitry via the radio frequency path to:
the second antenna arrangement via the frequency up converter or to the first antenna arrangement not via the frequency up-converter.

17. An apparatus as claimed in claim 14 comprising:
at least second radio frequency receiver circuitry configured for operation at least in one or more second radio frequency bands; and
a switching arrangement for switching the second antenna arrangement from being used by the radio frequency circuitry to being used by the second radio frequency receiver circuitry.

18. An apparatus comprising:
radio frequency circuitry configured for operation at least in one or more first radio frequency bands;
a first antenna arrangement configured for operation in the one or more first radio frequency bands;
a second antenna arrangement configured for operation in one or more second radio frequency bands;
a radio frequency path configured to enable transfer of a signal in the one or more first radio frequency bands between the radio frequency circuitry and the first antenna arrangement and also between the radio frequency circuitry and the second antenna arrangement;
a frequency converter positioned between the radio frequency path and the second antenna arrangement configured to enable, for a signal, frequency conversion between the one or more second radio frequency bands and the one or more first radio frequency bands; and
a node at which the radio frequency path meets with a second radio frequency path to the second antenna arrangement via the frequency converter and a first radio frequency path to the first antenna arrangement not via the frequency converter, wherein a length of the radio frequency path between the node and the radio frequency circuitry is at least an order of magnitude greater than a length of the first radio frequency path and at least an order of magnitude greater than a length of the second radio frequency path.

* * * * *